No. 664,842. Patented Jan. 1, 1901.
A. C. EINSTEIN.
CARBID CONTAINER FOR ACETYLENE GAS GENERATORS.
(Application filed Apr. 3, 1900.)
(No Model.)
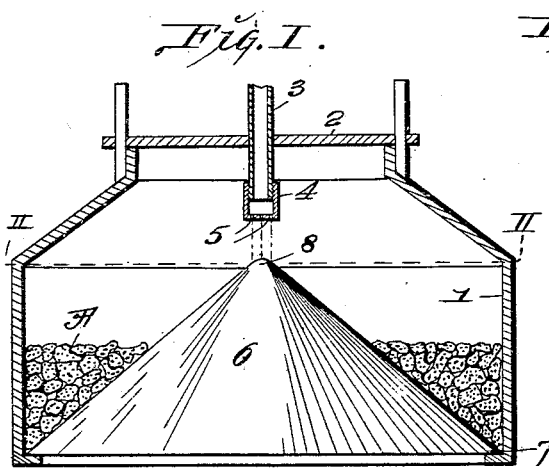
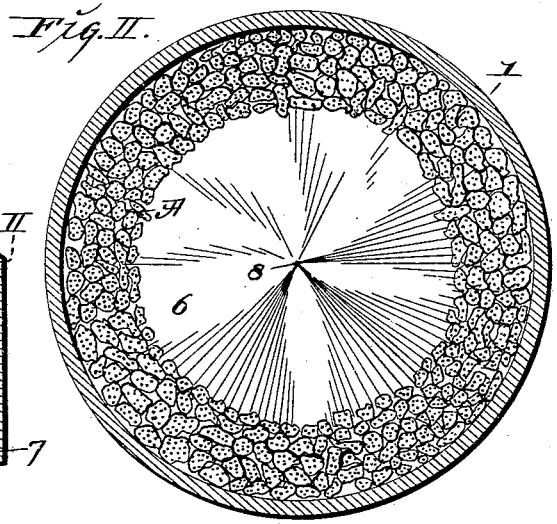
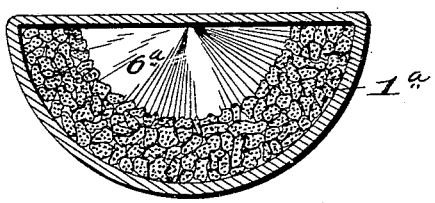
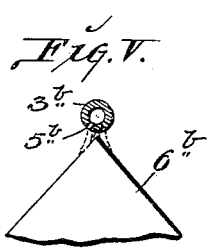
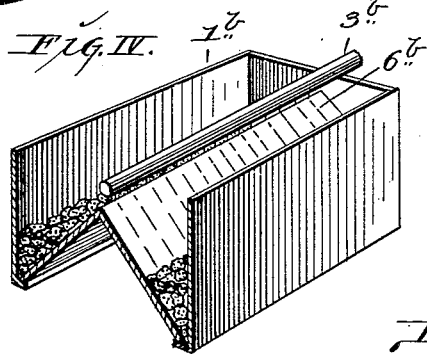
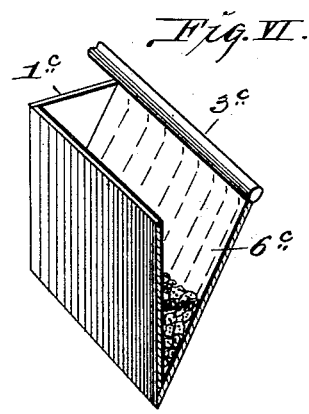
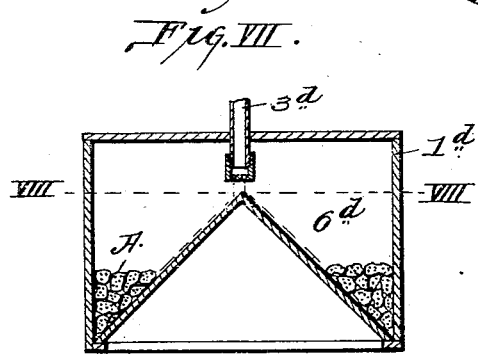
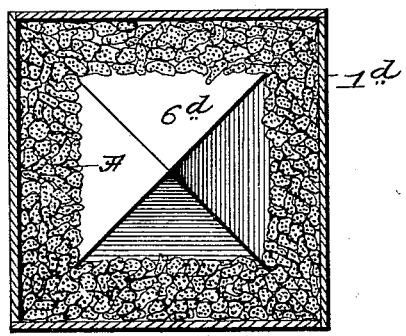
Attest:
G. G. Roe
E. S. Knight
Inventor:
Alfred C. Einstein.
By Wright Bro. atty's
THE NORRIS PETERS CO., PHOTO-LITHO., WASHINGTON, D. C.

UNITED STATES PATENT OFFICE.

ALFRED C. EINSTEIN, OF ST. LOUIS, MISSOURI.

CARBID-CONTAINER FOR ACETYLENE-GAS GENERATORS.

SPECIFICATION forming part of Letters Patent No. 664,842, dated January 1, 1901.

Application filed April 3, 1900. Serial No. 11,393. (No model.)

*To all whom it may concern:*

Be it known that I, ALFRED C. EINSTEIN, a citizen of the United States, residing at the city of St. Louis, in the State of Missouri, have invented certain new and useful Improvements in Carbid-Containers for Acetylene-Gas Generators, of which the following is a full, clear, and exact description, reference being had to the accompanying drawings, forming part of this specification.

My invention relates to a carbid-container for use in connection with acetylene-gas-generating apparatus to hold the carbid from which the gas is evolved and receive the supply of water, the introduction of which, combining with the carbid, effects decomposition thereof and produces the gas. In generators of this description it is the present practice to deliver the supply of water directly on top of the mass of calcium carbid, from which the water moves downwardly and outwardly to the walls of the carbid-container. This manner of subjecting the carbid to the water causes the carbid at the top of the mass to be the first decomposed, with the result that such carbid soon becomes a solid mass of useless residue through which the water must pass to the remainder of the carbid before the generation of gas is effected in the further operation of the apparatus. Where the water is fed to the carbid on top of it, the part of the carbid that thus receives the water soon becomes a semiliquid or pasty mass that prevents the ready passage of the gas upwardly therethrough, thereby interfering with the proper release of the gas from the mass of carbid. Furthermore, such part of the carbid residue initially retains the water by partially absorbing it and not permitting it to readily pass therefrom to the unconsumed carbid around it, whereas when the apparatus has been shut down for the purpose of stopping the generation of gas the water that was theretofore held by the decomposed carbid residue gradually leaves said residue and is taken up by the unconsumed carbid, thereby causing a continued generation of gas after the shutting down of the apparatus and resulting in not only the waste of gas by its blowing off from the apparatus, but a dangerous heating of the generator.

It is the object of my invention to produce a carbid-container in which the water is delivered to the carbid at the bottom of the mass instead of at the top and from which the water gradually passes upwardly and outwardly, thereby causing the lower portion of the mass of carbid to be first attacked in decomposition, while the surmounting portion remains dry to permit the ready upward flow of the gas therethrough and also absorbs the moisture from the gas instead of being confined below said upper portion, as is at present the case in generators of the description to which my invention relates.

To the end of obtaining the desired result named my invention consists in the features hereinafter fully described and claimed.

Figure I is a vertical sectional view illustrating my preferred form of container. Fig. II is a horizontal sectional view taken on the line II II, Fig. I. Fig. III is a horizontal sectional view of a modified construction of the container. Fig. IV is a view of another modification shown partly in perspective and partly in vertical section. Fig. V is a detail view of the water-shed shown in Fig. IV and the water-delivery pipe. Fig. VI is a view of another modification, partly in perspective and partly in vertical section. Fig. VII is a vertical sectional view of another modification. Fig. VIII is a horizontal sectional view taken on the line VIII VIII, Fig. VII.

Referring first to Fig. I, 1 represents the container-shell, equipped with a cover 2. 3 designates a water-delivery pipe that enters the container and has affixed to it a cap 4, having perforations 5, through which the water is discharged into the interior of the container. A designates the mass of calcium carbid.

The essential feature of my invention has reference to the watershed, on which the water is delivered from the conveying-pipe to the carbid A. The watershed 6 (shown in Figs. I and II) is of conical form and forms the bottom of the container, the edge 7 of the cone preferably extending to the side wall of the container, while the apex 8 of the cone occupies a position beneath the perforated cap 4 of the water-delivery pipe 2, so that the water discharged from said pipe falls onto or around the apex of the cone and sheds down the sloping wall thereof to the under side of the mass A of calcium carbid to first enter the under portion of said mass and to gradually enter the surmounting part of the carbid as said water rises within the container. By this arrangement it is impossible for the supply of water to first commingle with and decompose the upper part or layers of carbid and produce a solid mass thereof, through which the gas cannot escape, but instead the upper part or layers remain in a comparatively dry condition and permit the rise of the gas evolved at the bottom of the container, absorbing the moisture from the gas as it rises. The watershed in the container is exposed, as shown, to the exterior of the container, so that the surrounding air is permitted free access to the maximum surface of the container, thereby permitting free radiation of the heat occurring within the container and allowing the surrounding air or other cooling medium to absorb the heat instead of its remaining confined within the container to the detrimental operation thereof and avoiding danger from overheating.

In Figs. I to VIII, inclusive, I have illustrated varied forms of containers, the construction of which differs from the form shown in Figs. I and II, but in all of these the operation is identical, in that the water is admitted from above and is shed downwardly to the base of the carbid in the manner that has been described.

In the modification shown in Fig. III, I have shown a container $1^a$ of semispherical shape in cross-section, the watershed $6^a$ being in the shape of a half-cone instead of a full cone, as in the form shown in Figs. I and II.

In Figs. IV and V, I have shown a container $1^b$ of drawer type, the water being delivered from a perforated conveying-pipe $3^b$ onto the apex of the angular watershed $6^b$ and flowing down said shed to the carbid.

In Fig. VI, I have shown a V-shaped container $1^c$, against the inner surface of one of the walls of which the perforated water-conveying pipe $3^c$ is designed to discharge and the water to be delivered down the watershed or wall $6^c$ to the bottom of the container at the bottom of the mass of carbid.

In the modification shown in Figs. VII and VIII the container $1^d$ is of rectangular shape and the watershed $6^d$ is of pyramidal form, as clearly shown in Fig. VIII, the water being delivered to said shed from a delivery-pipe $3^d$ and falling onto the apex thereof in similar manner to that described in connection with the form of device shown in Figs. I and II.

I claim as my invention—

A carbid-container for acetylene-gas generators comprising a shell, a water-pipe leading into said shell, and a watershed extending upwardly into the interior of the container and having its outer surface exposed to the surrounding air or cooling medium, substantially as described.

ALFRED C. EINSTEIN.

In presence of—
E. S. KNIGHT,
N. V. ALEXANDER.